United States Patent
Kuboyama et al.

(10) Patent No.: US 10,951,021 B2
(45) Date of Patent: Mar. 16, 2021

(54) POWER CONVERSION SYSTEM

(71) Applicant: Mitsubishi Electric Corporation, Tokyo (JP)

(72) Inventors: Yutaka Kuboyama, Tokyo (JP); Naoki Nishio, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/638,596

(22) PCT Filed: Nov. 22, 2018

(86) PCT No.: PCT/JP2018/043214
§ 371 (c)(1),
(2) Date: Feb. 12, 2020

(87) PCT Pub. No.: WO2020/105176
PCT Pub. Date: May 28, 2020

(65) Prior Publication Data
US 2021/0013815 A1 Jan. 14, 2021

(51) Int. Cl.
*H02H 7/122* (2006.01)
*H02M 1/32* (2007.01)
(Continued)

(52) U.S. Cl.
CPC .............. *H02H 7/122* (2013.01); *H02J 3/34* (2013.01); *H02M 1/32* (2013.01); *H02M 7/493* (2013.01)

(58) Field of Classification Search
CPC ..... H02H 7/122–127; H02H 7/12; H02J 3/34; H02J 3/38; H02M 1/32; H02M 7/493
See application file for complete search history.

(56) References Cited

U.S. PATENT DOCUMENTS 7,301,313 B1* 11/2007 Hart .................. G06F 1/263
  323/269
7,596,706 B2* 9/2009 Fuseya .................. G11C 5/147
  713/300
(Continued)

FOREIGN PATENT DOCUMENTS

JP 2002-369541 A 12/2002
JP 2004-140909 A 5/2004
(Continued)

OTHER PUBLICATIONS

International Search Report, issued in PCT/JP2018/043214, PCT/ISA/210, dated Jan. 8, 2019.

*Primary Examiner* — Yusef A Ahmed
(74) *Attorney, Agent, or Firm* — Birch, Stewart, Kolasch & Birch, LLP

(57) ABSTRACT

A power conversion system includes one power conversion device and one or more power conversion devices. The power conversion device includes a power converter that controls output voltage to be a preset voltage to apply the preset voltage to a load on the basis of an output from a power supply. The power conversion device controls the power converter so that a detected value of the first voltage detected by a voltage detector becomes a preset voltage value. The power conversion devices each include a power converter that controls output current to be a preset current to supply the preset current to the load on the basis of an output from a power supply. The power conversion devices each controls operation of the power converter on the basis of the detected value of the first voltage. The power conversion device controls operation of the power converter by changing the first voltage.

23 Claims, 8 Drawing Sheets

(51) Int. Cl.
　　　*H02M 7/493*　　　(2007.01)
　　　*H02J 3/34*　　　(2006.01)

(56) References Cited

U.S. PATENT DOCUMENTS

| | | | |
|---|---|---|---|
| 9,093,861 B2 * | 7/2015 | Nakano | H02J 9/062 |
| 10,848,065 B2 * | 11/2020 | Kawai | H02M 7/219 |
| 10,848,068 B2 * | 11/2020 | Iyasu | H02M 3/33576 |
| 2002/0067630 A1 * | 6/2002 | Tokunaga | H02M 1/4208 |
| | | | 363/125 |
| 2009/0189582 A1 * | 7/2009 | Watanabe | H02M 1/32 |
| | | | 323/282 |
| 2009/0302816 A1 * | 12/2009 | Kunimatsu | H02M 3/156 |
| | | | 323/282 |
| 2014/0327315 A1 * | 11/2014 | Baba | H02J 3/46 |
| | | | 307/81 |
| 2015/0326000 A1 * | 11/2015 | Kanzaki | H02H 7/1257 |
| | | | 361/101 |
| 2016/0006344 A1 * | 1/2016 | Hayashi | G05F 1/577 |
| | | | 307/31 |
| 2018/0358907 A1 * | 12/2018 | Kato | H02M 7/53871 |
| 2019/0006957 A1 * | 1/2019 | Ito | H02M 1/126 |
| 2019/0334442 A1 * | 10/2019 | Iyasu | H02M 3/33576 |
| 2020/0099305 A1 * | 3/2020 | Kawai | H02J 1/102 |
| 2020/0274357 A1 * | 8/2020 | Inoue | H02J 3/32 |
| 2020/0280258 A1 * | 9/2020 | Yamazaki | H02M 7/5395 |
| 2020/0379493 A1 * | 12/2020 | Chamberlain | H04B 3/548 |

FOREIGN PATENT DOCUMENTS

| | | |
|---|---|---|
| JP | 2009-159663 A | 7/2009 |
| JP | 2015-6029 A | 1/2015 |
| JP | 2016-96659 A | 5/2016 |
| JP | 2018-46604 A | 3/2018 |

\* cited by examiner

POWER CONVERSION SYSTEM

FIELD

The present invention relates to a power conversion system including a plurality of power conversion devices that supply power to a load on the basis of outputs from power supplies.

BACKGROUND

Patent Literature 1 mentioned below teaches a technology for stabilizing power supply to a load connected in common in a power conversion system having a configuration in which first and second power conversion devices are connected in parallel between respective power supplies for the first and second power conversion devices and the common load.

Specifically, according to Patent Literature 1, when power input to the first power conversion device from the load is detected, a power path between the second power conversion device and the load is disconnected. This avoids interruption of power supply from the first power conversion device to the load due to a protective function, and stabilizes power supply to the load.

CITATION LIST

Patent Literature

Patent Literature 1: Japanese Patent Application Laid-open No. 2015-006029

SUMMARY

Technical Problem

In Patent Literature 1, however, a circuit breaker is needed to disconnect the power path. The technology of Patent Literature 1 is thus problematic in increase in cost and in degradation of the system reliability. There have therefore been demands for stabilization of power supply to a load without circuit breakers.

The present invention has been made in view of the above, and an object thereof is to provide a power conversion system capable of stabilizing power supply to a load without using circuit breakers.

Solution to Problem

To solve the aforementioned problems and achieve the object, a power conversion system according to the present invention includes: one first power conversion device connected between a first power supply and a load; and one or more second power conversion devices connected between a second power supply and the load in parallel with the first power conversion device. The first power conversion device includes: a first power converter that controls output voltage to be a preset voltage to apply the preset voltage to the load on the basis of an output from the first power supply; and a first voltage detector that detects a first voltage that is a voltage at a connection point of the first power converter and the load. The first power conversion device controls operation of the first power converter so that a detected value of the first voltage detected by the first voltage detector becomes a preset voltage value. The second power conversion devices each include: a second power converter that controls output current to be a preset current to supply the preset current to the load on the basis of an output from the second power supply. The second power conversion devices each control operation of the second power converter on the basis of the detected value of the first voltage. The first power conversion device controls operation of the second power converter by changing the first voltage.

Advantageous Effects of Invention

According to the power conversion system according to the present invention, an effect of stabilizing power supply to a load without using circuit breakers is produced.

DESCRIPTION OF EMBODIMENTS

A power conversion system according to certain embodiments of the present invention will be described in detail below with reference to the drawings. Note that the present invention is not limited to the embodiments below. In addition, electrical connection and physical connection are hereinafter not distinguished from each other, and will be simply referred to as "connection" in the description.

First Embodiment

Figure 1:
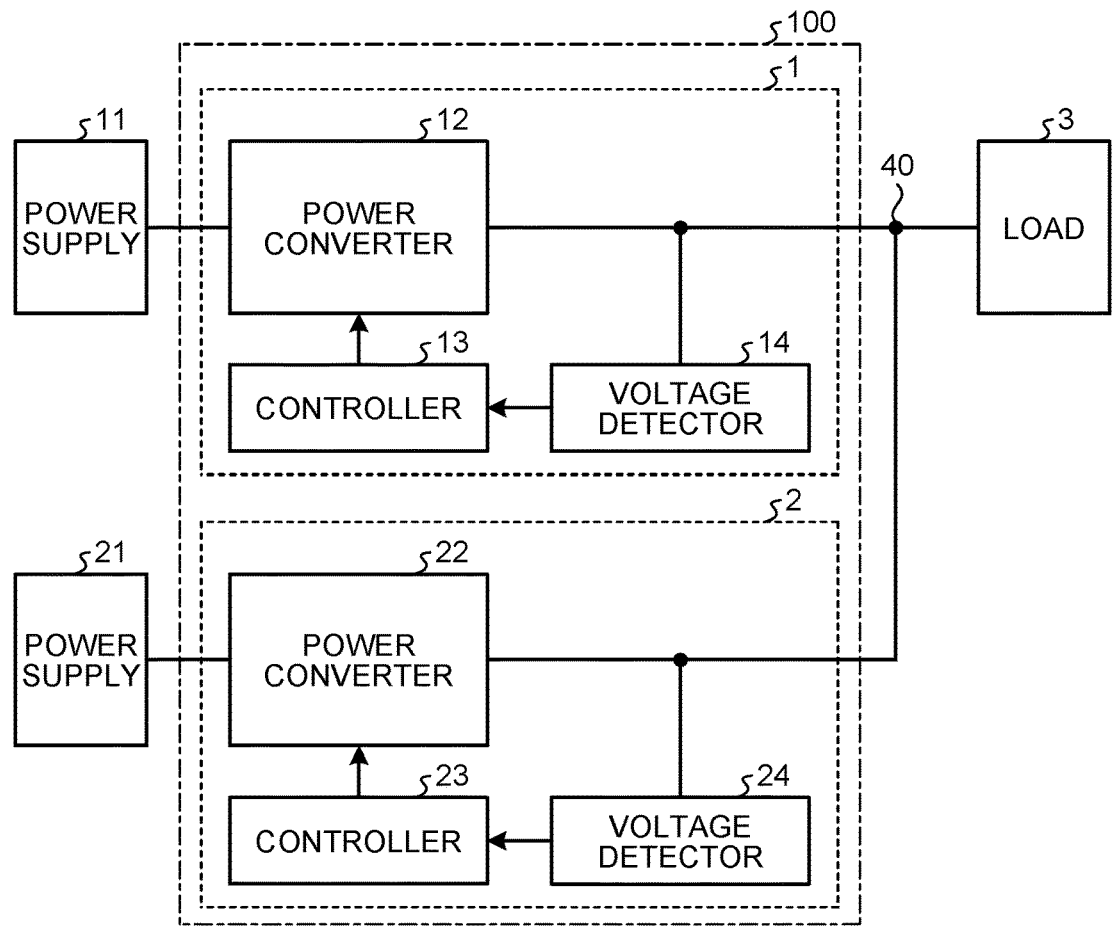
FIG. 1 is a diagram illustrating a configuration of a power conversion system according to a first embodiment.

FIG. 1 is a diagram illustrating a configuration of a power conversion system 100 according to a first embodiment. As illustrated in FIG. 1, the power conversion system 100 according to the first embodiment includes a power conversion device 1 that is a first power conversion device, and a power conversion device 2 that is a second power conversion device.

The power conversion device 1 is connected between a power supply 11 that is a first power supply and a load 3 that is a that is a load connected in common. The power conversion device 1 converts direct current (DC) power output from the power supply 11 into alternating current (AC) power, and supplies the AC power to the load 3. The power supply 11 and the power conversion device 1 operate as a voltage source. The power conversion device 1 controls output voltage to be a preset voltage on the basis of an output from the power supply 11, and applies the output voltage to the load 3.

The power conversion device 2 is connected between a power supply 21 that is a second power supply and the load 3. The power conversion device 2 is connected with the load 3 in parallel with the power conversion device 1. The power conversion device 2 converts DC power output from the power supply 21 into AC power, and supplies the AC power to the load 3. The power supply 21 and the power conversion device 2 operate as a current source. The power conversion device 2 controls output current to be a preset current on the basis of an output from the power supply 21, and supplies the output current to the load 3.

The power conversion device 1 includes a power converter 12 that is a first power converter, a controller 13 that is a first controller, and a voltage detector 14 that is a first voltage detector. The voltage detector 14 detects the voltage at a connection point 40 between the voltage detector 14 and the load 3. Hereinafter, the voltage at the connection point 40 will be referred to as "first voltage" as appropriate. Note that the connection of the voltage detector 14 may be at a position other than the connection point 40, as illustrated, as long as the potential is equal to that at the connection point 40.

The controller 13 controls the voltage output from the power converter 12 on the basis of a detected value of the first voltage detected by the voltage detector 14. More specifically, the controller 13 controls the operation of the power converter 12 so that the detected value of the first voltage becomes a preset voltage value.

The power conversion device 2 includes a power converter 22 that is a second power converter, a controller 23 that is a second controller, and a voltage detector 24 that is a second voltage detector. The voltage detector 24 detects the voltage at the connection point 40, that is, the first voltage. Note that the connection of the voltage detector 24 may be at a position other than the connection point 40, as illustrated, as long as the potential is equal to that at the connection point 40.

The controller 23 controls the current output from the power converter 22 on the basis of a detected value of the first voltage detected by the voltage detector 24. More specifically, the controller 23 stops the operation of the power converter 22 when the detected value of the first voltage is an abnormal value. The controller 23 also controls the operation of the power converter 22 so that the output current becomes the preset current when the detected value of the first voltage is a normal voltage value.

Note that the configurations and the functions of the power converters 12 and 22 are known, and detailed description thereof will be omitted herein. In addition, the configuration and the functions of the controller 13 that controls the voltage output from the power converter 12 to be the preset voltage and the configuration and the functions of the controller 23 that controls the current output from the power converter 22 to be the present current are also known, and detailed description thereof will be omitted herein. These configurations and functions are taught in Patent Literature 1, Japanese Patent Application Laid-open No. 2002-369541 cited in the specification of Patent Literature 1, etc., which can be referred to.

In addition, FIG. 1 illustrates a configuration in which each of the power conversion devices 1 and 2 detects the voltage at the connection point 40. In the case of the configuration of FIG. 1, the power conversion devices 1 and 2 have basic configurations that are the same as each other, which produces an effect of enabling standardization of the configurations of the power conversion devices.

Alternatively, a configuration in which the power conversion device 2 includes no voltage detector 24 and the controller 23 receives the detected value from the voltage detector 14 included in the power conversion device 1, for example, may be used instead of the configuration of FIG. 1. This configuration has an effect of reducing the voltage detectors 24. In a case where a plurality of power conversion devices 2 are included, the effect of reducing the voltage detectors will be significant.

Figure 2:
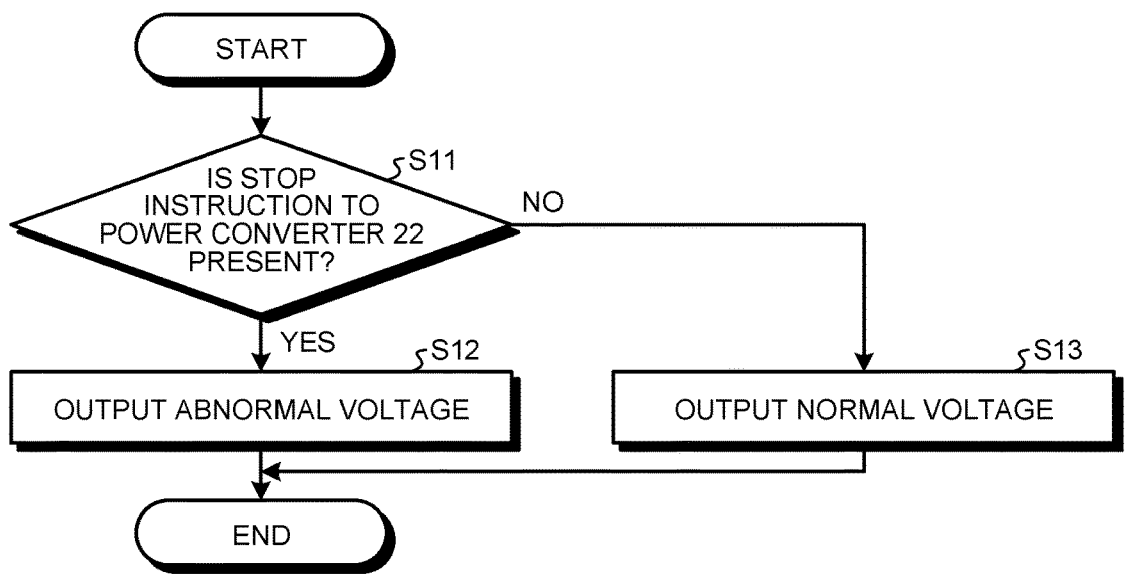
FIG. 2 illustrates a sequence of control of the output voltage in the power conversion system according to the first embodiment in a form of a flowchart.
Figure 3:
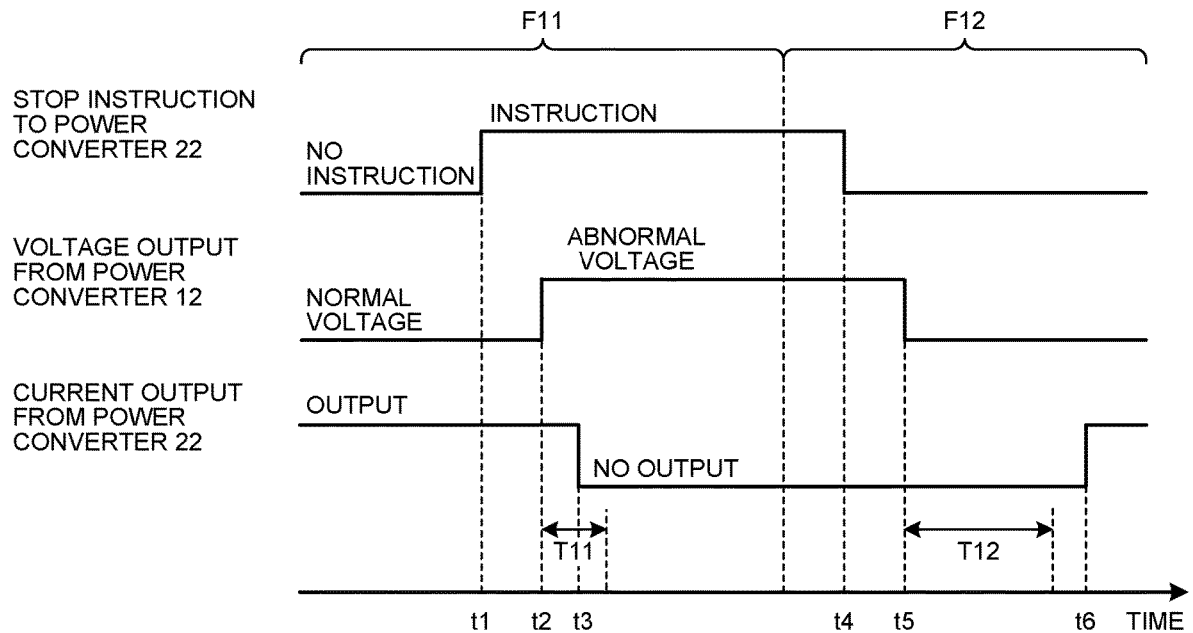
FIG. 3 is a timing diagram illustrating operation of controlling output voltage in the power conversion system according to the first embodiment.

Next, operation of main part of the power conversion system 100 according to the first embodiment will be explained with reference to FIGS. 1 to 3. FIG. 2 illustrates a sequence of control of the output voltage in the power conversion system 100 according to the first embodiment in a form of a flowchart. FIG. 3 is a timing diagram illustrating operation of controlling the output voltage in the power conversion system 100 according to the first embodiment.

First, the controller 13 determines whether or not a stop instruction to the power converter 22 is present (step S11).

Note that examples of conditions for determining whether or not a stop instruction to the power converter 22 is present include the following two conditions:

(1) when power input from the load 3 side into the power converter 12 is detected; and (2) when a rise in the voltage in the power converter 12 is detected.

In addition, a case where the power supply 11 corresponds to the following (3) or (4) is assumed as a basis of the determination of (1) and (2) above:

(3) a case where the power supply 11 is a solar cell;

(4) a case where power supply 11 is a battery and the battery cannot be recharged owing to the charged state of the battery.

When power is input to the power converter 12 in the case where the power supply 11 corresponds to (3) or (4), the input power cannot flow anywhere else, and the voltage in the power converter 12 rises. If this state continues, the power converter 12 has to be stopped. Thus, in the case where the condition (1) or (2) is satisfied, it is determined that a stop instruction to the power converter 22 is present, and a process below is performed. Note that whether or not the condition (2) is satisfied can be determined on the basis of a preset determination value. The determination value may be held in the controller 13 or may be provided to the controller 13 from the outside.

If a stop instruction to the power converter 22 is present (step S11, Yes), the controller 13 controls the power converter 12 so that an abnormal voltage is output from the power converter 12 (step S12).

If no stop instruction to the power converter 22 is present (step S11, No), the controller 13 controls the power converter 12 so that a normal voltage is output from the power converter 12 (step S13).

The sequence of FIG. 2 is terminated as a result of the process in step S12 or step S13.

FIG. 3 illustrates changes in waveforms at the respective components in transition from a normal voltage output state to an abnormal voltage output state, and changes in waveforms at the respective components in transition from the abnormal voltage output state to the normal voltage output state. The horizontal axis in FIG. 3 represents time. In FIG. 3, F11 represents a phase in which output of current from the power converter 22 is stopped, and F12 represents a phase in which output of current from the power converter 22 is resumed.

In the example of FIG. 3, a stop instruction to the power converter 22 is output at time t1, and the output from the power converter 12 is changed from normal voltage to abnormal voltage at time t2. The abnormal voltage is a voltage value outside of a target range. The abnormal voltage output from the power converter 12 is detected by the voltage detector 24. The controller 23 recognizes that the detected value from the voltage detector 24 is the abnormal voltage, and performs control to stop the operation of the power converter 22. The power converter 22 stops the output of current before a setting time T11 of a protective function elapses. In the example of FIG. 3, the output current is stopped at time t3 that is less than the settling time T11 from time t2.

In addition, in the example of FIG. 3, the stop instruction to the power converter 22 is cancelled at time t4, and the output from the power converter 12 is changed from the abnormal voltage to the normal voltage at time t5. The normal voltage output from the power converter 12 is detected by the voltage detector 24. The controller 23 recognizes that the detected value from the voltage detector 24 has been changed from the abnormal voltage to the normal voltage, and performs control to resume the operation of the power converter 22. The power converter 22 resumes the output of current after a settling time T12 of a power recovery timer elapses, for example. In the example of FIG. 3, the output of current is resumed at time t6 that is over the settling time T12 from time t5.

Figure 4:
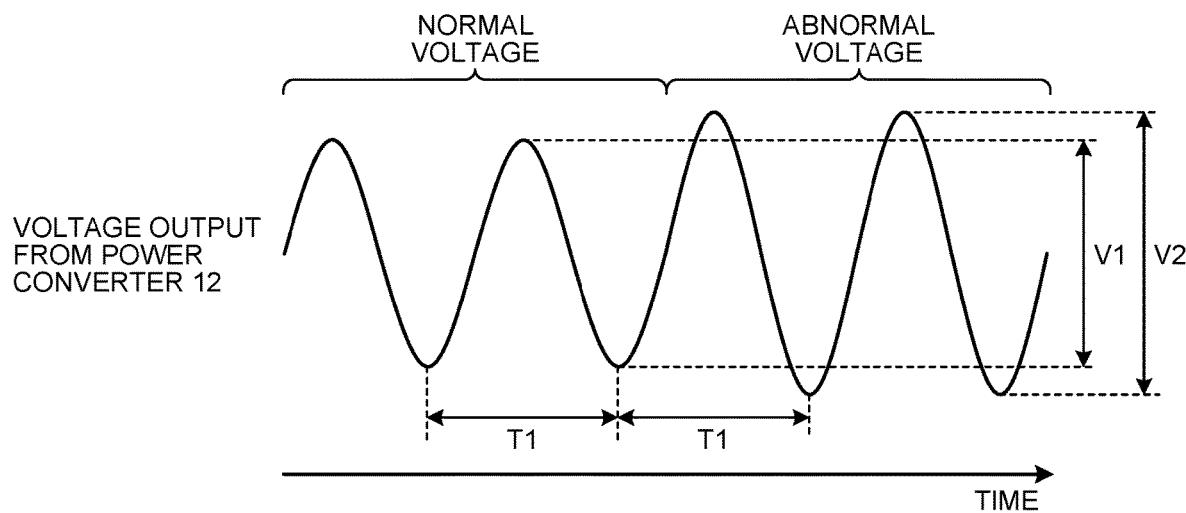
FIG. 4 is a graph illustrating a first example of abnormal voltage output from a first power converter in the first embodiment.

FIGS. 4 to 7 are graphs illustrating examples of the abnormal voltage. FIG. 4 is a graph illustrating a first example of the abnormal voltage output from the power converter 12 in the first embodiment. In the example of FIG. 4, a waveform of the normal voltage that is an output voltage waveform with a peak-to-peak value being V1 and the length of one period being T1, and a waveform of the abnormal voltage that is an output voltage waveform with the length of one period being the same T1 and a peak-to-peak value of the output voltage waveform being V2 (V2>V1) relative to the normal voltage are illustrated. The value V2 is a value obtained by raising an effective value the output voltage so that the controller 23 detects overvoltage. The abnormal voltage is detected by the voltage detector 24 and the detected value is sent to the controller 23. The controller 23 detects overvoltage of the output voltage on the basis of the detected value from the voltage detector 24. This causes the power converter 22 to stop operating.

Figure 5:
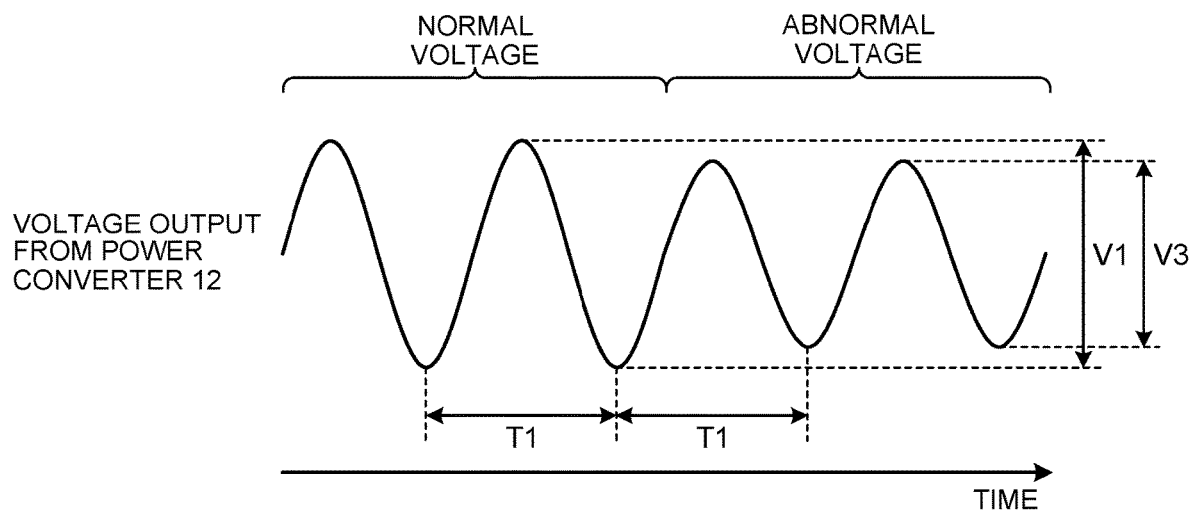
FIG. 5 is a graph illustrating a second example of abnormal voltage output from the first power converter in the first embodiment.

FIG. 5 is a graph illustrating a second example of the abnormal voltage output from the power converter 12 in the first embodiment. In the example of FIG. 5, a waveform of the normal voltage that is an output voltage waveform with a peak-to-peak value being V1 and the length of one period being T1, and a waveform of the abnormal voltage that is an output voltage waveform with the length of one period being the same T1 and a peak-to-peak value of the output voltage waveform being V3 (V3<V1) relative to the normal voltage are illustrated. The value V3 is a value obtained by lowering an effective value of the output voltage so that the controller 23 detects undervoltage. The abnormal voltage is detected by the voltage detector 24 and the detected value is sent to the controller 23. The controller 23 detects undervoltage of the output voltage on the basis of the detected value from the voltage detector 24. This causes the power converter 22 to stop operating.

Figure 6:
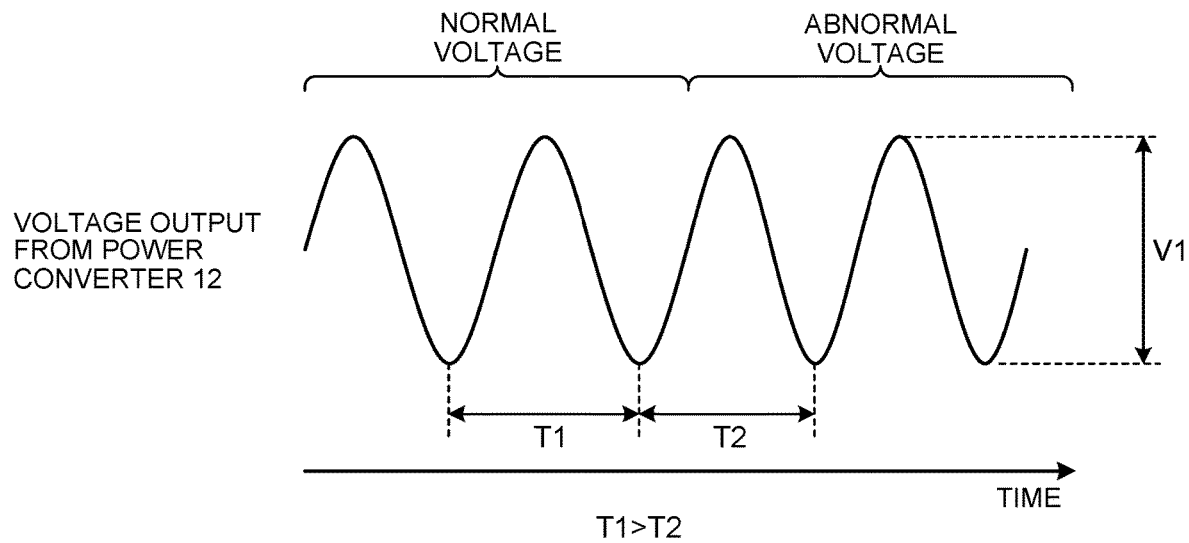
FIG. 6 is a graph illustrating a third example of abnormal voltage output from the first power converter in the first embodiment.

FIG. 6 is a graph illustrating a third example of the abnormal voltage output from the power converter 12 in the first embodiment. In the example of FIG. 6, a waveform of the normal voltage that is an output voltage waveform with a peak-to-peak value being V1 and the length of one period being T1, and a waveform of the abnormal voltage that is an output voltage waveform with a peak-to-peak value being the same V1 and the length of one period being T2 (T2<T1) relative to the normal voltage are illustrated. The value T2 is obtained by increasing the frequency of the output voltage ("decreasing the period" in the example of FIG. 6) so that the controller 23 detects the increase in the frequency. The abnormal voltage is detected by the voltage detector 24 and the detected value is sent to the controller 23. The controller 23 detects the increase in the frequency of the output voltage on the basis of the detected value from the voltage detector 24. This causes the power converter 22 to stop operating.

Figure 7:
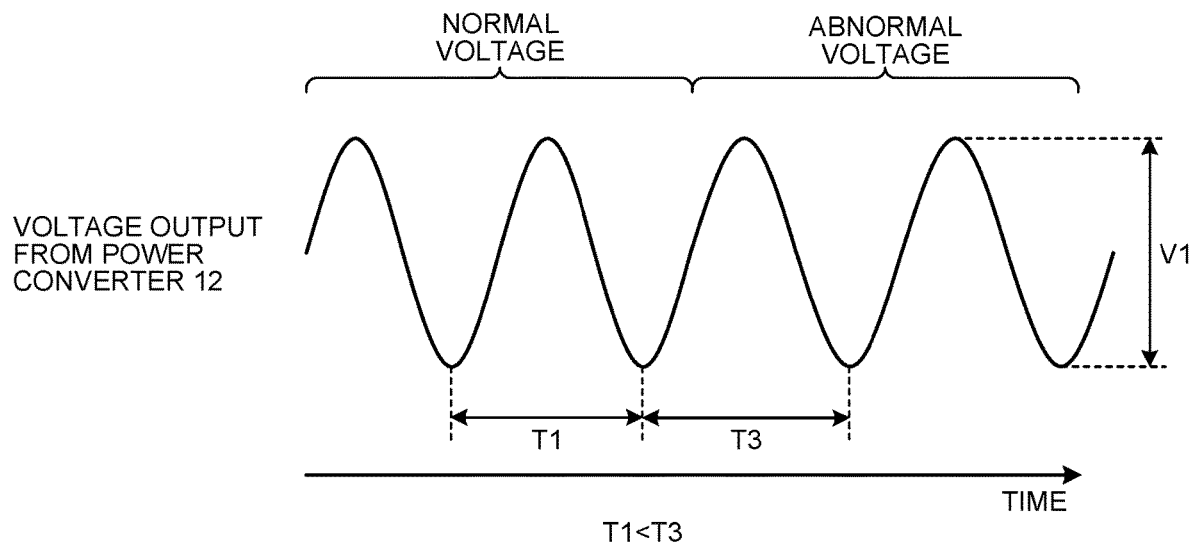
FIG. 7 is a graph illustrating a fourth example of abnormal voltage output from the first power converter in the first embodiment.

FIG. 7 is a graph illustrating a fourth example of the abnormal voltage output from the power converter 12 in the first embodiment. In the example of FIG. 7, a waveform of the normal voltage that is an output voltage waveform with a peak-to-peak value being V1 and the length of one period being T1, and a waveform of the abnormal voltage that is an output voltage waveform with a peak-to-peak value being the same V1 and the length of one period being T3 (T3>T1) relative to the normal voltage are illustrated. The value T3 is obtained by decreasing the frequency of the output voltage ("increasing the period" in the example of FIG. 7) so that the controller 23 detects the decrease in the frequency. The abnormal voltage is detected by the voltage detector 24 and the detected value is sent to the controller 23. The controller 23 detects the decrease in the frequency of the output voltage on the basis of the detected value from the voltage detector 24. This causes the power converter 22 to stop operating.

Figure 8:
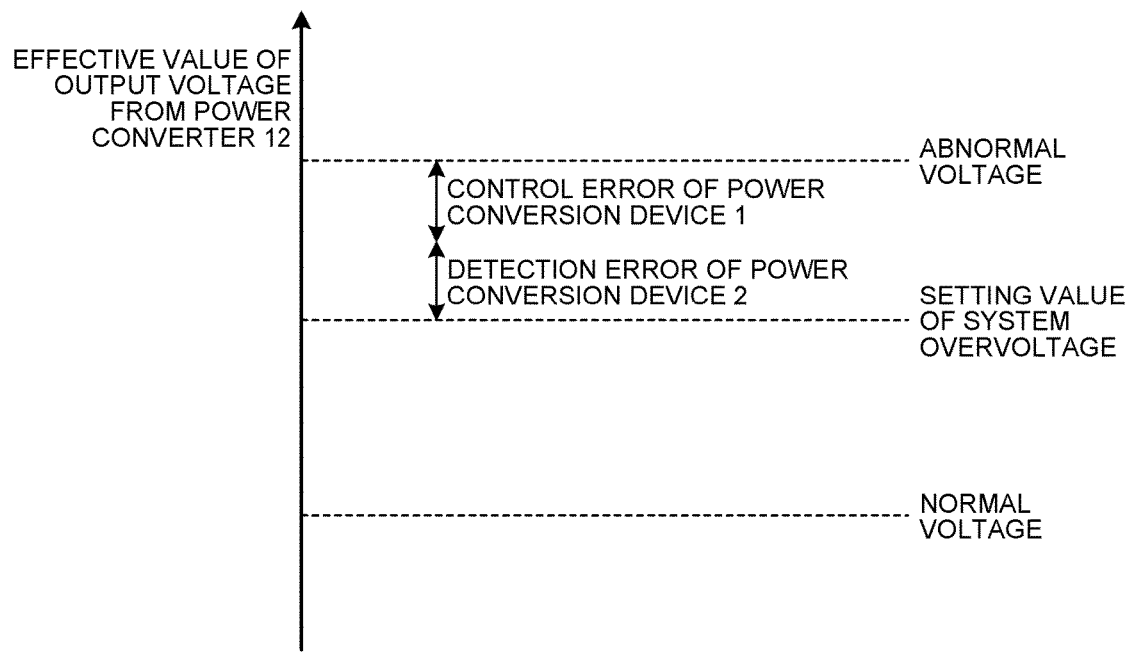
FIG. 8 is a graph illustrating an example of settings of an effective value of abnormal voltage output from the first power converter in the first embodiment.

FIG. 8 is a graph illustrating an example of settings of the effective value of the abnormal voltage output from the power converter 12 in the first embodiment. FIG. 8 illustrates three levels on the effective value of the voltage output from the power converter 12 by broken lines. The three levels are, from the bottom, the normal voltage, a setting value of system overvoltage, and the abnormal voltage. System means commercial power supply.

In a case where the power conversion system 100 and the commercial power supply are interconnected, the setting value for the protective function is typically set to an equal value at the power converter 12 and the power converter 22 by interconnection conference with the power company. The setting value for the protective function mentioned herein is a setting value for detecting system overvoltage, system undervoltage, a frequency increase, a frequency decrease, or the like. Such setting values can be used as a determination value for determining abnormality of the first voltage, which is the voltage at the connection point 40.

In the case where the effective value of the output voltage from the power converter 12 is raised as in the example of FIG. 4, the setting value of the system overvoltage set for the power converter 12 is used as a reference value. In the first embodiment, control error of the power conversion device 1 and detection error of the power conversion device 2 are further considered. Thus, in the first embodiment, the effective value of the abnormal voltage output from the power converter 12 is set to a value obtained by adding the control error of the power conversion device 1 and the detection error of the power conversion device 2 to the setting value of system overvoltage, as illustrated in FIG. 8. In this manner, the amount of change of the output voltage from the power converter 12 is determined on the basis of the setting value of system overvoltage.

In the examples of FIGS. 5 to 7, the settings are similar to those in the example of FIG. 4. Specifically, the settings are as follows.

In the case where the effective value of the output voltage from the power converter 12 is decreased as in the example of FIG. 5, the setting value of the system undervoltage set for the power converter 12 is used as a reference value. A value obtained by subtracting the control error of the power conversion device 1 and the detection error of the power conversion device 2 from the reference value is then set as the effective value of the abnormal voltage output from the power converter 12.

In addition, in the case where the frequency of the output voltage from the power converter 12 is increased as in the example of FIG. 6, the setting value of the frequency increase set for the power converter 12 is used as a reference value. A value obtained by adding the control error of the power conversion device 1 and the detection error of the power conversion device 2 relating to the frequency to the reference value is then set as the frequency of the abnormal voltage.

In addition, in the case where the frequency of the output voltage from the power converter 12 is decreased as in the example of FIG. 7, the setting value of the frequency decrease set for the power converter 12 is used as a reference value. A value obtained by subtracting the control error of the power conversion device 1 relating to the frequency and the detection error of the power conversion device 2 relating to the frequency from the reference value is then set as the frequency of the abnormal voltage.

As described above, according to the power conversion system according to the first embodiment, the first power conversion device controls the operation of the first power converter so that the detected value of the first voltage detected by the first voltage detector becomes the preset voltage value. In addition, the second power conversion device connected in parallel with the first power converter controls the second power converter on the basis of the detected value of the first voltage. The first power conversion device then controls the operation of the second power converter by performing control to change the first voltage. This enables the operation of the second power converter, which is not controlled by the first power conversion device, to stop by controlling the output voltage, and thus enables stabilization of power supply to the load without using circuit breakers.

In addition, according to the power conversion system according to the first embodiment, power supply to the load can be continued while the first power conversion device is prevented from stopping owing to input of power from the load side. This improves the quality of power supplied to the load.

Furthermore, according to the power conversion system according to the first embodiment, the abnormal voltage is set on the basis of the setting value of the protective function set for the power converters. This limits the change from the normal voltage to a minimum amount, which reduces the risk that the load stops owing to the abnormal voltage.

While the configuration including one power conversion device 2 is described in the first embodiment, a configuration in which two or more power conversion devices 2 are connected may be used. Specifically, in the configuration of FIG. 1, one power conversion device 1 is connected with the load 3 and operates together with one or more power conversion devices 2. In the case of two or more power conversion devices 2, each of the second and subsequent power conversion devices 2 operates similarly to the first power conversion device 2 that operates as a current source. Thus, in a power conversion system including one power conversion device 1 and two or more power conversion devices 2, the operation of each of the power conversion devices 2 operating as current sources can be stopped without use of circuit breakers.

Second Embodiment

Figure 9:
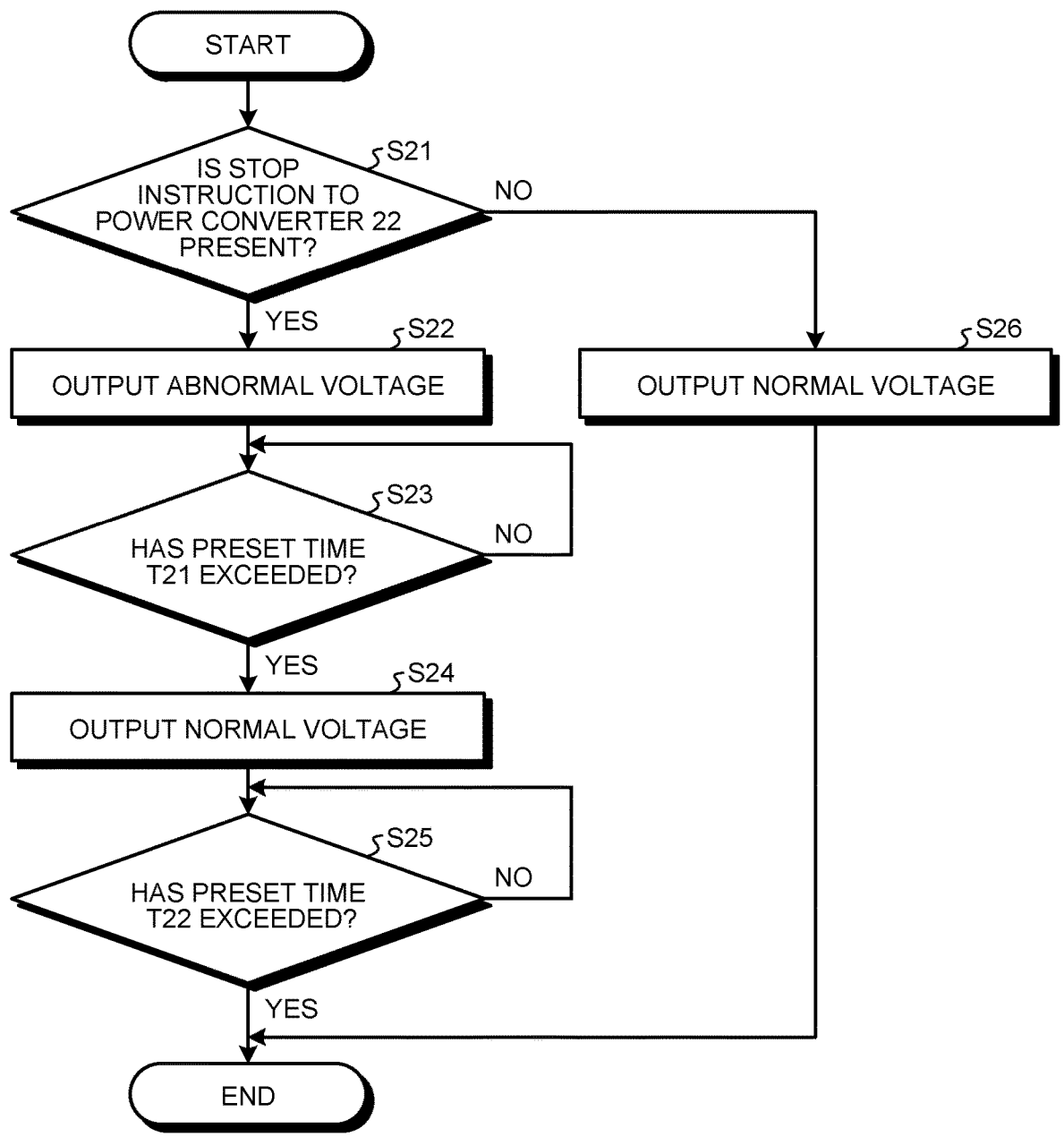
FIG. 9 illustrates a sequence of control of output voltage in a power conversion system according to a second embodiment in a form of a flowchart.
Figure 10:
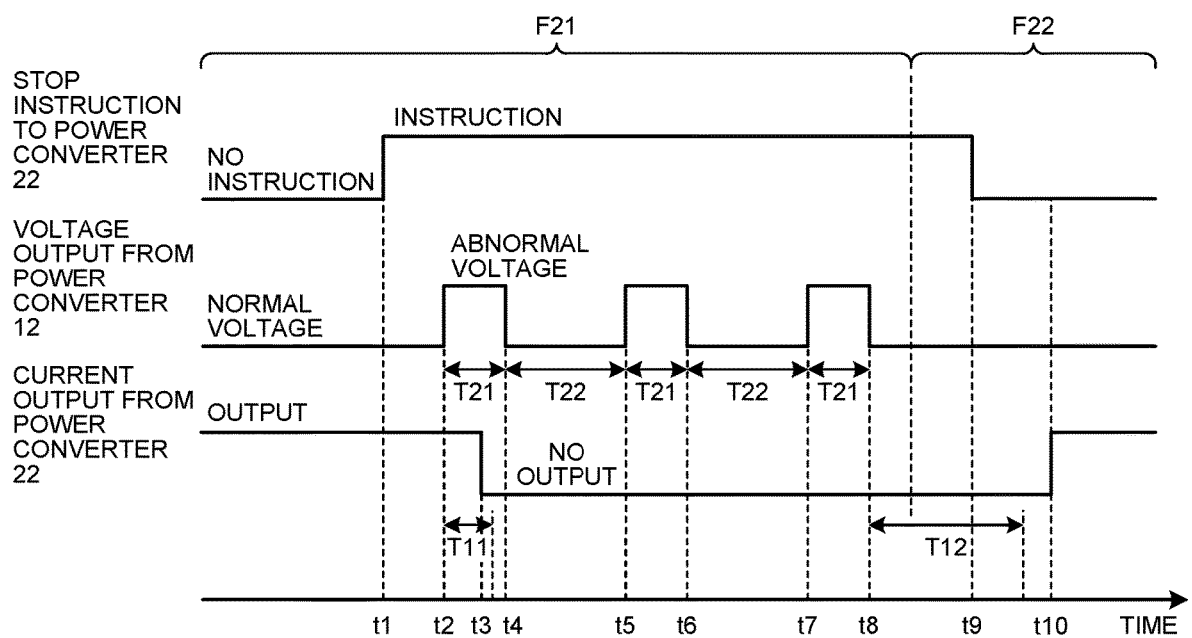
FIG. 10 is a timing diagram illustrating operation of controlling output voltage in the power conversion system according to the second embodiment.

FIG. 9 illustrates a sequence of control of the output voltage in the power conversion system 100 according to a second embodiment in a form of a flowchart. FIG. 10 is a timing diagram illustrating operation of controlling the output voltage in the power conversion system 100 according to the second embodiment. Hereinafter, operation of the power conversion system according to the second embodiment will be explained with reference to FIGS. 9 and 10. Note that the configuration of the power conversion system according to the second embodiment is the same as that in FIG. 1.

The controller 13 determines whether or not a stop instruction to the power converter 22 is present (step S21). The conditions for determining whether or not a stop instruction to the power converter 22 is present are similar to those in the first embodiment.

If a stop instruction to the power converter 22 is present (step S21, Yes), the controller 13 controls the power converter 12 so that an abnormal voltage is output from the power converter 12 (step S22).

The controller 13 determines whether or not the output time of the abnormal voltage has exceeded a preset time T21 (step S23). If the output time of the abnormal voltage has not exceeded the preset time T21 (step S23, No), the determination process in step S23 is continued.

In the output time of the abnormal voltage has exceeded the preset time T21 (step S23, Yes), the controller 13 controls the power converter 12 so that the normal voltage is output from the power converter 12 (step S24).

The controller 13 then determines whether or not the output time of the normal voltage has exceeded a preset time T22 (step S25). If the output time of the normal voltage has not exceeded the preset time T22 (step S25, No), the determination process in step S25 is continued.

If the output time of the normal voltage has exceeded the preset time T22 (step S25, Yes), the flow in FIG. 9 is terminated. If the stop instruction to the power converter 22 is continued, however, the processes from step S22 to step S25 are repeated.

In step S21, if no stop instruction to the power converter 22 is present (step S21, No), the controller 13 controls the power converter 12 so that the normal voltage is output from the power converter 12 (step S26), and the flow of FIG. 9 is terminated.

As described above, in the second embodiment, even when a stop instruction to the power converter 22 is present, the abnormal voltage is not output continuously, but is output periodically. The periodical output is a difference from the first embodiment.

FIG. 10 illustrates a state of changes in waveforms at the respective components in a case where the sequence of FIG. 9 is applied to the control. The horizontal axis in FIG. 10 represents time. In FIG. 10, F11 represents a phase in which output of current from the power converter 22 is stopped, and F22 represents a phase in which output of current from the power converter 22 is resumed.

In the example of FIG. 10, a stop instruction to the power converter 22 is output at time t1, and the output from the power converter 12 is changed from the normal voltage to the abnormal voltage at time t2. The controller 23 of the power converter 22 recognizes the abnormal voltage and performs control to stop the operation of power converter 22 in the same manner as in the first embodiment. The power converter 22 stops the output of current before a setting time T11 of a protective function elapses. In the example of FIG. 10, the output current is stopped at time t3 that is less than the settling time T11 from time t2.

In the example of FIG. 10, the abnormal voltage is output between time t5 and time t6 and between time t7 and time t8. In addition, the normal voltage is output between time t4 and time t5 and between time t6 and time t7. As illustrated in FIG. 10, the time during which the normal voltage is output, that is, the preset time T22 is shorter than the settling time T12 of the power recovery timer. Thus, the power converter 22 does not operate and output current.

After time t8, the stop instruction to the power converter 22 is cancelled at time t9. In addition, the output from the power converter 12 is changed to the normal voltage at the point of time t8. Thus, the output of current is resumed at time t10 that is over the settling time T12 of the power recovery timer from time t8.

In a case where the power conversion system 100 and the commercial power supply are interconnected, the setting value for the protective function is typically set to an equal value at the power converter 12 and the power converter 22 by interconnection conference with the power company. The setting value for the protective function mentioned herein is, in a manner similar to that in the first embodiment, a setting value for detecting system overvoltage, system undervoltage, a frequency increase, a frequency decrease, or the like. Note that such setting values can be used as a determination value for determining abnormality of the first voltage, which is the voltage at the connection point 40, in a manner similar to the first embodiment.

In the second embodiment, the preset time T21 during which the abnormal voltage is output can be set on the basis of the settling time T11 of the protective function set for the power converter 12 and the power converter 22, a control delay time in the power conversion device 1, and a detection delay time in the power conversion device 2. In addition, the preset time T22 during which the normal voltage is output can be set on the basis of the settling time T12 of the power recovery timer set for the power converter 12 and the power converter 22, the control delay time in the power conversion device 1, and the detection delay time in the power conversion device 2.

Note that, when the period during which the abnormal voltage is output is set in advance, one of the preset time T21 and the preset time T22 is determined upon determination of the other.

As described above, according to the power conversion system according to the second embodiment, the abnormal voltage is periodically changed when outputting the abnormal voltage from the first power conversion device. As a result, the abnormal voltage and the normal voltage are output alternately, which reduces the time during which the abnormal voltage is output and reduces the risk that the load stops owing to the abnormal voltage.

In addition, according to the power conversion system according to the second embodiment, the time during which the abnormal voltage is output can be set on the basis of the settling time of the protective function and the settling time of the power recovery timer set for the power conversion devices. This minimizes the time during which the abnormal voltage is output, which reduces the risk that the load stops owing to the abnormal voltage.

Third Embodiment

Figure 11:
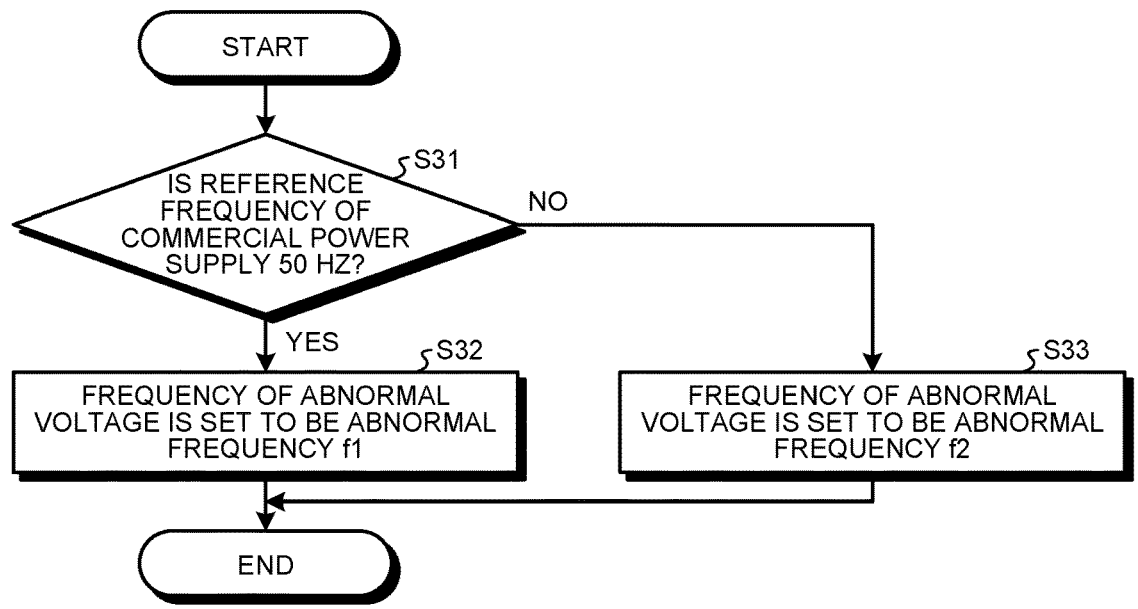
FIG. 11 illustrates a sequence of switching settings of output voltage in a power conversion system according to a third embodiment in a form of a flowchart.
Figure 12:
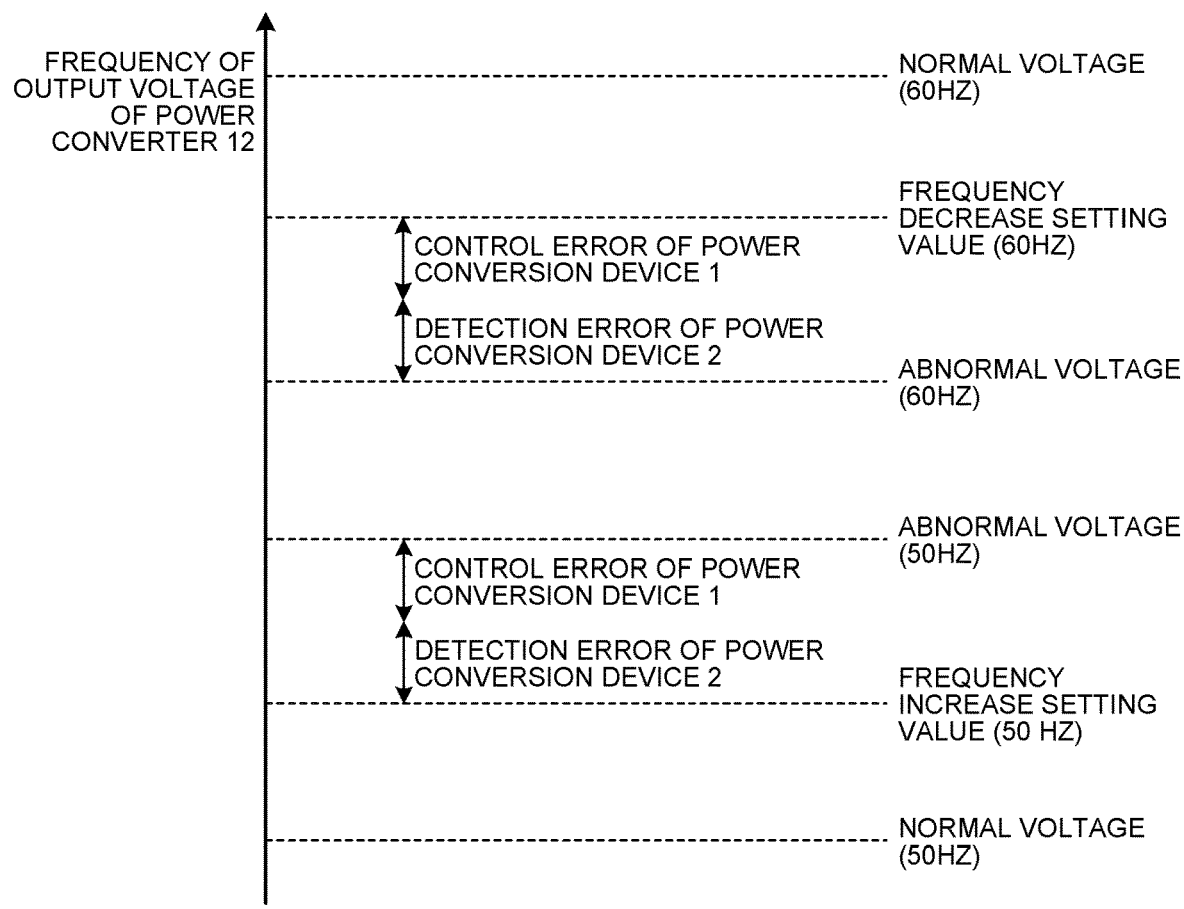
FIG. 12 is a graph illustrating an example of settings of the frequency of abnormal voltage output from a power converter in the third embodiment.

FIG. 11 illustrates a sequence of switching settings of output voltage in a power conversion system 100 according to a third embodiment in a form of a flowchart. FIG. 12 is a graph illustrating an example of settings of the frequency of abnormal voltage output from the power converter 12 in the third embodiment. Hereinafter, operation of the power conversion system according to the third embodiment will be explained with reference to FIGS. 11 and 12. Note that the configuration of the power conversion system according to the third embodiment is the same as that in FIG. 1.

The controller 13 determines whether or not a reference frequency of the commercial power supply is 50 Hz (step S31). If the reference frequency of the commercial power supply is 50 Hz (step S31, Yes), the operation proceeds to step S32. If the reference frequency of the commercial power supply is not 50 Hz (step S31, No), the operation proceeds to step S33.

Additional explanation of the determination process in step S31 is as follows. In Japan, the reference frequency of the commercial power supply is 50 Hz or 60 Hz. Thus, in a case of a power conversion system installed in Japan, the determination process in step S31 is a process of determining whether the reference frequency of the commercial power supply is 50 Hz or 60 Hz. Information on the reference frequency of the commercial power supply may be provided to the power conversion device 1 from the outside, or may be automatically detected by the power conversion device 1 when the power conversion device 1 is connected with the commercial power supply. In the case where the power conversion device 1 automatically detects the information, the determination on whether the reference frequency of the commercial power supply is 50 Hz or 60 Hz can be made on the basis of the detected value from the voltage detector 14.

The description refers back to FIG. 11, in which, if the reference frequency of the commercial power supply is 50 Hz (step S31, Yes), the controller 13 controls the power converter 12 to set the frequency of the abnormal voltage to be an abnormal frequency f1 (step S32).

If the reference frequency of the commercial power supply is 60 Hz (step S31, No), the controller 13 controls the power converter 12 to set the frequency of the abnormal voltage to be an abnormal frequency f2 (step S33).

FIG. 12 illustrates six levels on the frequency of the output voltage output from the power converter 12 in the third embodiment by broken lines. The six levels are, from the bottom, the normal voltage (50 Hz), a frequency increase setting value (50 Hz), the abnormal voltage (50 Hz), the abnormal voltage (60 Hz), a frequency decrease setting value (60 Hz), and the normal voltage (60 Hz).

When the reference frequency of the commercial power supply is 50 Hz, the frequency of the abnormal voltage is set to a value obtained by adding the detection error relating to the frequency of the power conversion device 2 and the control error relating to the frequency of the power conversion device 1 to the frequency increase setting value (50 Hz) set for the power conversion device 2.

When the reference frequency of the commercial power supply is 60 Hz, the frequency of the abnormal voltage is set to a value obtained by subtracting the control error relating to the frequency of the power conversion device 1 and the detection error relating to the frequency of the power conversion device 2 from the frequency decrease setting value (60 Hz) set for the power conversion device 2. Thus, the frequency of the abnormal voltage in the case of 50 Hz and the frequency of the abnormal voltage in the case of 60 Hz are set between the frequency of the normal voltage in the case of 50 Hz and the frequency of the normal voltage in the case of 60 Hz.

According to the power conversion system according to the third embodiment, in a case where the load 3 is usable at 50 Hz and 60 Hz, the load 3 is expected to operate normally at a frequency between 50 Hz and 60 Hz. Thus, the frequency of the abnormal voltage is changed between 50 Hz and 60 Hz as in the example of FIG. 12. This reduces the risk that the load 3 stops operating owing to the abnormal voltage.

In addition, in the first to third embodiments, a method (hereinafter referred to as a "first method") of changing the effective value or the frequency of the voltage output by the power conversion device 1 operating as a voltage source, and stopping the power conversion device 2 operating as a current source by the protective function in accordance with system interconnection regulations has been described. Note that the protective function in accordance with the system interconnection regulations refers to a protective function of AC overvoltage, AC undervoltage, a frequency increase, or a frequency decrease.

Instead of the first method, a method (hereinafter referred to as a "second method") of stopping the power conversion device 2 operating as a current source by using a function of preventing isolated operation detection in accordance with the system interconnection regulations may be employed.

Alternatively, instead of the first and second method, a method (hereinafter referred to as a "third method") of stopping the power conversion device 2 operating as a current source by using a protective function such as reverse power detection in accordance with the system interconnection regulations may be employed.

Alternatively, instead of the first to third methods, a method (hereinafter referred to as a "fourth method") of stopping the power conversion device 2 operating as a current source by using a protective function based on a proprietary specification of power conversion devices may be employed. The protective function based on a proprietary specification may generate an abnormal voltage by changing the phase of the output voltage or generate an abnormal voltage by adding a harmonic wave to the output voltage, for example.

Alternatively, a method combining one or more of the protective functions used in the first to fourth methods may be employed. In this case, the power conversion device 1 operating as a voltage source generates an abnormal voltage by combining one or more of the effective value, the frequency, the phase, and the harmonic wave of the voltage.

Furthermore, while a plurality of power conversion devices 1 and 2 and the common load 3 are connected with each other in parallel via an AC power path in the first to third embodiments, the power conversion devices 1 and 2 and the common load 3 may be connected with each other in parallel via a DC power path. In such a configuration, provision of a power conversion device that converts direct current into alternating current between a connection point of the power conversion devices 1 and 2 and the common load 3 enables supply of AC power to the load 3 that is an AC load.

Note that the power supplies 11 and 21 connected with the respective power conversion devices 1 and 2 may be any of dispersed power supplies such as stationary batteries, on-board batteries, stationary fuel cells, on-board fuel cells, and solar cells.

Figure 13:
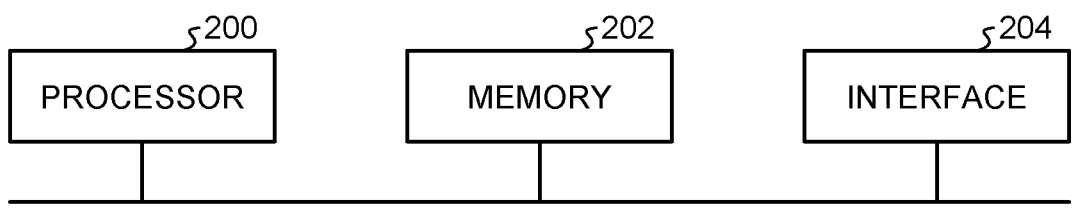
FIG. 13 is a block diagram illustrating an example of a hardware configuration implementing the functions of first and second controllers in the first to third embodiments.
Figure 14:
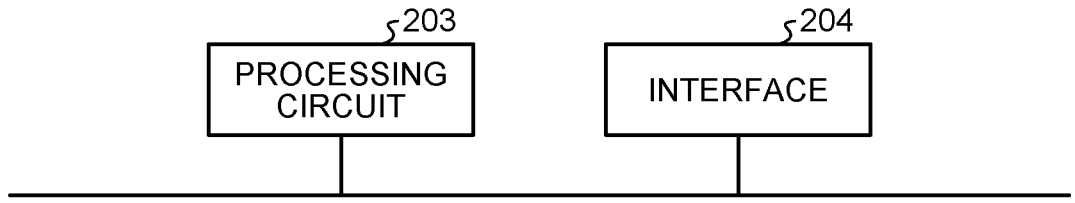
FIG. 14 is a block diagram illustrating another example of a hardware configuration implementing the functions of the first and second controllers in the first to third embodiments.

Finally, hardware configurations for implementing the functions of the controllers 13 and 23 in the first to third embodiments will be described with reference to FIGS. 13 and 14. FIG. 13 is a block diagram illustrating an example of a hardware configuration implementing the functions of the controllers 13 and 23 in the first to third embodiments. FIG. 14 is a block diagram illustrating another example of a hardware configuration implementing the functions of the controllers 13 and 23 in the first to third embodiments.

As illustrated in FIG. 13, for implementing all or some of the functions of the controllers 13 and 23 in the first embodiment, a configuration including a processor 200 that performs computation, a memory 202 in which programs to be read by the processor 200 are saved, and an interface 204 for signal input and output can be used.

The processor 200 may be a computation unit such as a computing device, a microprocessor, a microcomputer, a central processing unit (CPU), or a digital signal processor (DSP). In addition, examples of the memory 202 include a volatile or nonvolatile semiconductor memory such as a random access memory (RAM), a read only memory (ROM), a flash memory, an erasable programmable ROM (EPROM), or an electrically EPROM (EEPROM: registered trademark), a magnetic disk, a flexible disk, an optical disk, a compact disc, a mini disc, and a digital versatile disc (DVD).

The memory 202 stores programs for implementing all or some of the functions of the controllers 13 and 23. In addition, the memory 202 holds the setting value of the protective function and the settling time of the protective function described above. The processor 200 controls the power converter 12 or the power converter 22 by providing and receiving necessary information via the interface 204 and executing programs stored in the memory 202.

Alternatively, the processor 200 and the memory 202 illustrated in FIG. 13 may be replaced with a processing circuit 203 as in FIG. 14. The processing circuit 203 may be a single circuit, a composite circuit, an application specific integrated circuit (ASIC), a field-programmable gate array (FPGA), or a combination thereof. Alternatively, the processing circuit 203 may be constituted by an electrical circuit element such as an analog circuit or a digital circuit.

Note that the configurations presented in the embodiments above are examples of the present invention, and can be combined with other known technologies or can be partly omitted or modified without departing from the scope of the present invention.

REFERENCE SIGNS LIST 1, 2 power conversion device; 3 load; 11, 21 power supply; 12, 22 power converter; 13, 23 controller; 14, 24 voltage detector; 40 connection point; 100 power conversion system; 200 processor; 202 memory; 203 processing circuit; 204 interface.

The invention claimed is:

1. A power conversion system comprising: one first power conversion device connected between a first power supply and a load; and one or more second power conversion devices connected between a second power supply and the load in parallel with the first power conversion device, the first power conversion device and the one or more second power conversion devices supplying direct-current power to the load, wherein the first power conversion device includes:

a first power converting circuitry to control output voltage to be a preset voltage to apply the preset voltage to the load on the basis of an output from the first power supply; and a first voltage detecting circuitry to detect a first voltage, the first voltage being voltage at a connection point of the first power converting circuitry and the load, the first power conversion device controls operation of the first power converting circuitry so that a detected value of the first voltage detected by the first voltage detecting circuitry becomes a preset voltage value, the one or more second power conversion devices include:

a second power converting circuitry to control output current to be a preset current to supply the preset current to the load on the basis of an output from the second power supply, the one or more second power conversion devices control operation of the second power converting circuitry on the basis of the detected value of the first voltage, and the first power conversion device stops operation of the second power converting circuitry by changing the first voltage, and when changing the first voltage periodically, the first power conversion device determines at least one of a time during which the first voltage is changed and a time during which the first voltage is not changed on the basis of a settling time used for determination of abnormality of the first voltage.

2. The power conversion system according to claim 1, wherein the one or more second power conversion devices include:

a second voltage detecting circuitry to detect the first voltage, and the one or more second power conversion devices control the operation of the second power converting circuitry on the basis of a detected value of the first voltage detected by the second voltage detecting circuitry.

3. The power conversion system according to claim 1, wherein the one or more second power conversion devices stop the operation of the second power converting circuitry when the first voltage is abnormal, and control the second power converting circuitry so that the preset current is output from the second power converting circuitry when the first voltage is normal.

4. The power conversion system according to claim 1, wherein the first power conversion device changes the first voltage when power is input from the second power converting circuitry to the first power converting circuitry.

5. The power conversion system according to claim 1, wherein the first power conversion device has a determination value for determining abnormality of the first voltage, and determines a change amount by which the first voltage is to be changed on the basis of the determination value.

6. The power conversion system according to claim 1, wherein when changing the first voltage, the first power conversion device changes the first voltage continuously or periodically.

7. A power conversion system comprising: one first power conversion device connected between a first power supply and a load; and one or more second power conversion devices connected between a second power supply and the load in parallel with the first power conversion device, wherein the first power conversion device includes:

a first power converting circuitry to control output voltage to be a preset voltage to apply the preset voltage to the load on the basis of an output from the first power supply; and a first voltage detecting circuitry to detect a first voltage, the first voltage being voltage at a connection point of the first power converting circuitry and the load, the first power conversion device controls operation of the first power converting circuitry so that a detected value of the first voltage detected by the first voltage detecting circuitry becomes a preset voltage value, the one or more second power conversion devices include:

a second power converting circuitry to control output current to be a preset current to supply the preset current to the load on the basis of an output from the second power supply, the one or more second power conversion devices control operation of the second power converting circuitry on the basis of the detected value of the first voltage, the first power conversion device stops operation of the second power converting circuitry by changing the first voltage, the first power conversion device is a power conversion device being interconnectable with a commercial power supply, the first power conversion device has a determination value for determining abnormality of the commercial power supply at the first voltage when interconnecting with the commercial power, the first power conversion device determines a change amount of one or more of an effective value, a frequency, a phase, and a harmonic wave of the first voltage on the basis of the determination value, and wherein when changing the first voltage periodically, the first power conversion device determines at least one of a time during which the first voltage is changed and a time during which the first voltage is not changed on the basis of a settling time used for determination of abnormality of the first voltage.

8. The power conversion system according to claim 7, wherein
The one or more second power conversion devices include:
a second voltage detecting circuitry to detect the first voltage, and
the one or more second power conversion devices control the operation of the second power converting circuitry on the basis of a detected value of the first voltage detected by the second voltage detecting circuitry.

9. The power conversion system according to claim 7, wherein
the one or more second power conversion devices stop the operation of the second power converting circuitry when the first voltage is abnormal, and control the second power converting circuitry so that the preset current is output from the second power converting circuitry when the first voltage is normal.

10. The power conversion system according to claim 7, wherein
the first power converting circuitry converts direct-current power into alternating-current power on the basis of the output from the first power supply, and supplies the alternating-current power to the load, and
the first power conversion device changes one or more of the effective value, the frequency, the phase, and the harmonic wave of the first voltage.

11. The power conversion system according claim 7, wherein the first power conversion device changes the first voltage when power is input from the second power converting circuitry to the first power converting circuitry.

12. A power conversion system comprising: one first power conversion device connected between a first power supply and a load; and one or more second power conversion devices connected between a second power supply and the load in parallel with the first power conversion device, wherein
the first power conversion device includes:
a first power converting circuitry to control output voltage to be a preset voltage to apply the preset voltage to the load on the basis of an output from the first power supply; and
a first voltage detecting circuitry to detect a first voltage, the first voltage being voltage at a connection point of the first power converting circuitry and the load,
the first power conversion device controls operation of the first power converting circuitry so that a detected value of the first voltage detected by the first voltage detecting circuitry becomes a preset voltage value,
the one or more second power conversion devices include:
a second power converting circuitry to control output current to be a preset current to supply the preset current to the load on the basis of an output from the second power supply,
the one or more second power conversion devices control operation of the second power converting circuitry on the basis of the detected value of the first voltage,
the first power conversion device stops operation of the second power converting circuitry by changing the first voltage,
when changing the first voltage, the first power conversion device periodically changes the first voltage, and
wherein when changing the first voltage periodically, the first power conversion device determines at least one of a time during which the first voltage is changed and a time during which the first voltage is not changed on the basis of a settling time used for determination of abnormality of the first voltage.

13. The power conversion system according to claim 12, wherein
the one or more second power conversion devices include:
a second voltage detecting circuitry to detect the first voltage, and
the one or more second power conversion devices control the operation of the second power converting circuitry on the basis of a detected value of the first voltage detected by the second voltage detecting circuitry.

14. The power conversion system according to claim 12, wherein
the one or more second power conversion devices stop the operation of the second power converting circuitry when the first voltage is abnormal, and control the second power converting circuitry so that the preset current is output from the second power converting circuitry when the first voltage is normal.

15. The power conversion system according to claim 12, wherein
the first power converting circuitry converts direct-current power into alternating-current power on the basis of the output from the first power supply, and supplies the alternating-current power to the load, and
the first power conversion device changes one or more of an effective value, a frequency, a phase, and a harmonic wave of the first voltage.

16. The power conversion system according to claim 12, wherein
the first power conversion device changes the first voltage when power is input from the second power converting circuitry to the first power converting circuitry.

17. The power conversion system according claim 12, wherein
the first power conversion device has a determination value for determining abnormality of the first voltage, and determines a change amount by which the first voltage is to be changed on the basis of the determination value.

18. A power conversion system comprising: one first power conversion device connected between a first power supply and a load; and one or more second power conversion devices connected between a second power supply and the load in parallel with the first power conversion device, wherein
the first power conversion device includes:
a first power converting circuitry to control output voltage to be a preset voltage to apply the preset voltage to the load on the basis of an output from the first power supply; and
a first voltage detecting circuitry to detect a first voltage, the first voltage being voltage at a connection point of the first power converting circuitry and the load,
the first power conversion device controls operation of the first power converting circuitry so that a detected value of the first voltage detected by the first voltage detecting circuitry becomes a preset voltage value,
the one or more second power conversion devices include:
a second power converting circuitry to control output current to be a preset current to supply the preset current to the load on the basis of an output from the second power supply, the one or more second power conversion devices control operation of the second power converting circuitry on the basis of the detected value of the first voltage, the first power conversion device stops operation of the second power converting circuitry by changing the first voltage, the first power converting circuitry converts direct-current power into alternating-current power on the basis of the output from the first power supply and supplies the alternating-current power to the load, the first power conversion device changes one or more of an effective value, a frequency, a phase and a harmonic wave of the first voltage, the first power conversion device is a power conversion device interconnectable with a commercial power supply, and when changing the frequency of the first voltage, the first power conversion device determines a change amount by which the frequency of the first voltage is to be changed on the basis of the frequency of the commercial power supply; and wherein when changing the first voltage periodically, the first power conversion device determines at least one of a time during which the first voltage is changed and a time during which the first voltage is not changed on the basis of a settling time used for determination of abnormality of the first voltage.

19. The power conversion system according to claim 18, wherein the one or more second power conversion devices include:

a second voltage detecting circuitry to detect the first voltage, and the one or more second power conversion devices control the operation of the second power converting circuitry on the basis of a detected value of the first voltage detected by the second voltage detecting circuitry.

20. The power conversion system according to claim 18, wherein the one or more second power conversion devices stop the operation of the second power converting circuitry when the first voltage is abnormal, and control the second power converting circuitry so that the preset current is output from the second power converting circuitry when the first voltage is normal.

21. The power conversion system according claim 18, wherein the first power conversion device changes the first voltage when power is input from the second power converting circuitry to the first power converting circuitry.

22. The power conversion system according to claim 18, wherein the first power conversion device has a determination value for determining abnormality of the first voltage, and determines a change amount by which the first voltage is to be changed on the basis of the determination value.

23. The power conversion system according to claim 18, wherein when changing the first voltage, the first power conversion device changes the first voltage continuously or periodically.

* * * * *